Patented June 26, 1951

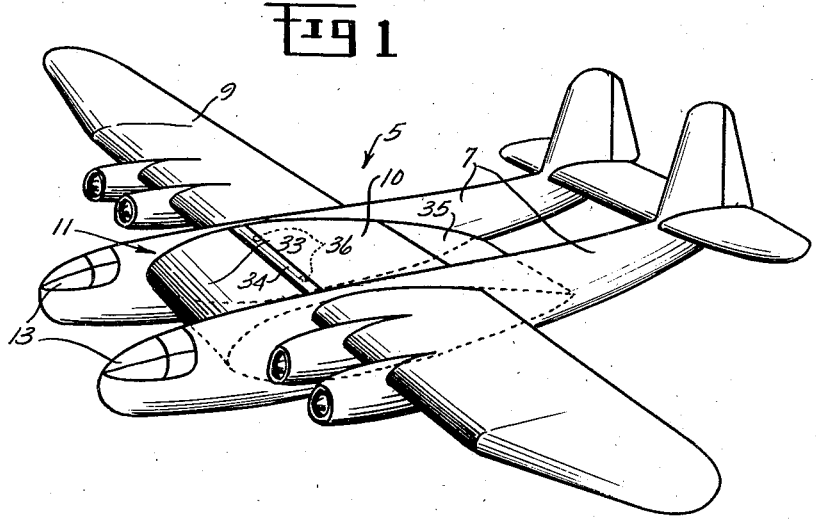
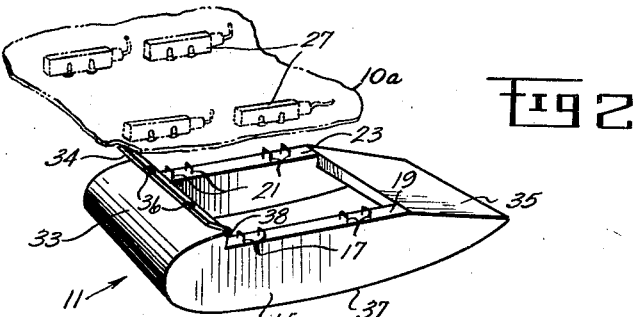
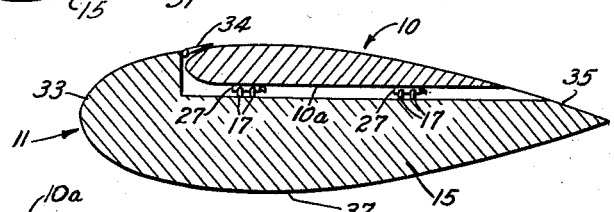
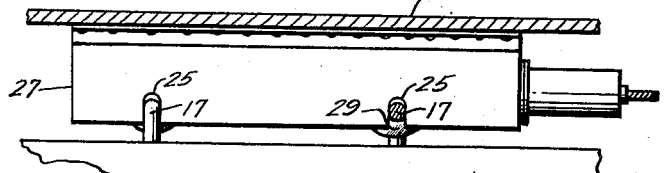

2,557,962

UNITED STATES PATENT OFFICE 2,557,962

CARGO AIRPLANE

Carl F. Greene, deceased, late of Langley Field, Va., by Dorothy Gunne Greene, executrix, Randolph Field, Tex.

Application May 3, 1946, Serial No. 666,933

2 Claims. (Cl. 244—118)

(Granted under the act of March 3, 1883, as amended April 30, 1928; 370 O. G. 757)

The invention described herein may be manufactured and used by or for the Government for governmental purposes, without the payment of any royalty thereon.

This invention relates to aircraft designed to carry cargo and more particularly to cargo carrying aircraft having a detachable streamlined cargo body.

At the present time, cargoes of all classes are generally carried within the fuselages of airplanes. The elongation of the fuselage is deemed justified by the recognized need for maintaining a maximum of aerodynamic fineness in proportion to the loads carried. A further contribution to this type of fuselage is the fact that virtually all large commercial aricraft are today intended actually and primarly for passenger accommodation. Therefore, efforts to convert these long tubular fuselages into freight carriers simply by superficial changes result. These superficial changes by which a passenger airplane is transformed into an inadequate freight carrier consist chiefly in the provision of large doors, heavy flooring, and means for shifting heavy items long distances forward and aft between doors and storage positions. This increase in the forward and aft distributions of loads with the growth of the conventional aircraft indicates the existance of an economical limit to the length of these bodies and consequently to the size of the cargo airplane itself.

The "all-wing" airplane either with or without tail surfaces apparently furnishes a theoretically satisfactory solution to this phase of the problem, but it has the practical disadvantage of requiring an extremely large wing if carrying compartments with ample heading room are to be provided across any considerable center portion of the wing. Therefore, it is apparent that a compromise between the class of airplanes employing long cylindrical fuselages and aircraft of sufficiently great size to afford storage space for large cargo items, must be accomplished.

Accordingly, it is an object of this invention to provide an aircraft having a cargo body of high capacity and large cross-sectional dimensions without a corresponding increase in the overall dimensions of the entire airplane.

It is a further object of this invention to provide in an airplane, a detachable cargo body carried under the wing and in substantial conformity therewith which has a streamlined shape to produce low aerodynamic drag and is preferably in the form of an air foil to cooperate with the wing in generating lift. This cargo body is attached to the underside of the wing in such a position as to make its upper surface continuous with the upper surface of the wing and it is capable of ready removal to permit it to be disengaged from the airplane on the ground.

It is a further object of this invention to provide an airplane having a streamlined detachable cargo body carried on the underside of its wing which is provided with means for releasing the cargo body from the airplane while it is in flight, much the same as bombs are released from airplanes.

It is a still further object of this invention to provide an airplane having a streamlined detachable cargo body carried on the underside of its wing so-designed and constructed that said airplane is capable of flying with or without said cargo body being attached.

These and other objects of the invention will become apparent from the following detailed description taken in conjunction with the accompanying drawings in which:

Fig. 1 is a perspective view of the airplane with the cargo body attached.

Fig. 2 is a perspective view of the cargo body alone with attaching means shown in phantom.

Fig. 3 is a side view of the cargo body attaching means.

Fig. 4 is a diagrammatic vertical sectional view through the central wing section, showing the cargo body in place.

As illustrated in Fig. 1, an aircraft generally designated at 5 is provided with symmetrically disposed twin nacelles 7 or fuselages and a wing 9 having its center section 10 extending between the two nacelles or fuselage. A cargo body generally indicated at 11 is releasably attached to the underside of wing 9 and positioned between nacelles 7. Each nacelle or fuselage 7 is provided with a cockpit 13 for the occupants of aircraft 5.

The cargo body 11 is constructed in the shape of an air foil having a greater chord than the chord of the wing so that when it is in place under wing 9, its forward end or leading edge 33 forms a forward elongation of the center section 10 of wing 9, while its rear end or trailing edge 35 provides a rearward elongation of center section 10 of wing 9. As shown in Fig. 2, a portion of the upper surface or camber of the cargo body 11 is cut out, or recessed, or interrupted to provide flat surfaces 19 and 23 which fit against the underside of center section 10 of wing 9. Cargo body 11 is positioned between nacelles 7, and the sides 15 of cargo body 11 are flat to fit against the inner or adjacent sides of nacelles 7, which are likewise flat and smooth. When cargo body 11 is in place under wing 9, a gap will exist between the leading edge of wing 9 and the rear of the upper surface or camber of the forward end 33 of cargo body 11. In order to eliminate or bridge this gap, a flap 34 is hinged as at 38 on the forward end 33 of cargo body 11 and is adapted to be closed over this gap and latched as at 36 to the leading edge of center section 10 of wing 9. Thus the upper surface or camber of the cargo body 11 and the top surface or camber of the wing 9 merge to form one continuous aerodynamic surface or camber. The bottom surface 37 of the cargo body 11 is likewise aerodynamically streamlined so as to act with wing 9 while in normal flight in providing lift for the airplane 5. The adjacent sides of the nacelles 7 act as end plates for the cargo body 11, causing its aspect ratio to be larger than that normally expected of a high chord member such as cargo body 11.

Four brackets 17 are equally spaced along the left upper recessed edge 19 of the cargo body 11. Likewise, four brackets 21 are provided along the right upper recessed edge 23. The brackets 17 and 21 are spaced to engage slots 25 provided in racks 27 which are attached to the underside of center section 10 of wing 9. As illustrated in the enlarged fragmentary view in Fig. 3, a small portion of the undersurface 10a of the central wing section is shown in vertical section, having racks 27 which are provided with fingers 29 which engage and hold brackets 17 and 21 when the cargo body 11 is placed in position under wing 9. Each rack 27 is provided with a solenoid operated release mechanism of the well known bomb release type which actuates the fingers 29. When the pilot of the airplane 5 pulls a release switch within the airplane, operating the release mechanism, the fingers 29 are rotated away from the brackets 17 and 21 and the cargo body 11 is released and dropped away from the airplane 5.

When the cargo body 11 is dropped from the airplane 5 while it is in flight, the aircraft 5 is still aerodynamically balanced and is capable of flying without the body 11 attached. As the occupants of the airplane are in the nacelles 7, they are in no way affected by the release of the cargo body.

Hoisting means (not shown) are provided to position cargo body 11 in its attached position under wing 9. These hoisting means can either be provided separate from the airplane 5, such as a hydraulically operated ground jack, or can be incorporated within the airplane itself. If the hoisting means is incorporated in the airplane, it must be capable of being disconnected from the cargo body 11 so that the cargo body can be released from the airplane in flight.

It will thus be seen that this invention proposes to overcome the deficiencies noted above in present cargo aircraft and to attain stated objectives by the provision of an airplane, an airplane and body in combination, and a body incorporating cargo carrying capabilities of wide variation as to size and weight.

While one particular embodiment of the invention has been described, it is understood that the invention is not to be restricted thereto, and all modifications are intended to be covered which would be apparent to one skilled in the art and which come within the scope of the appended claims.

What is claimed is:

1. In a cargo airplane a pair of longitudinally extending laterally spaced nacelles, a supporting wing of airfoil cross section and having outboard wing sections extending from said nacelles and a center section having at least an upper cambered surface, spanning the gap between said nacelles, a cargo container of generally airfoil cross section with a chord greater than the chord of the wing center section and a span substantially equal to the gap between the nacelles below the center section, said cargo container having a recessed portion between its leading and trailing edges adapted to receive the center section of the wing, the cargo container being so constructed that when placed contiguous with the underside of the wing center section the upper cambered surface of the center section cooperates with the cargo container to form an airfoil adapted to produce a substantial lift during flight and means for connecting and disconnecting the cargo container from the aircraft wing center section.

2. In a cargo airplane a pair of longitudinally extending laterally spaced nacelles, a supporting wing of airfoil cross section and having outboard wing sections extending from said nacelles and a center section having at least an upper cambered surface spanning the gap between said nacelles, a cargo container of generally airfoil cross section with a chord greater than the chord of the wing center section and a span substantially equal to the gap between the nacelles below the center section, said cargo container having a recessed portion between its leading and trailing edges adapted to receive the center section of the wing, the cargo container being so constructed that when placed contiguous with the underside of the wing center section the upper cambered surface of the center section cooperates with the cargo container to form an airfoil adapted to produce a substantial lift during flight and means for connecting and disconnecting the cargo container from the aircraft wing center section, and flap closure means hinged at the front edge of the recessed portion of the cargo container and extending rearwardly to contact with the upper surface of the center section for bridging the gap between the front edge of the recessed portion of the cargo container and the front edge portion of the center section.

DOROTHY GUNNE GREENE,
*Executrix of the Estate of Carl F. Greene, Deceased.*

REFERENCES CITED

The following references are of record in the file of this patent:

UNITED STATES PATENTS

| Number | Name | Date |
| --- | --- | --- |
| D. 145,929 | Dickson et al. | Nov. 19, 1946 |
| 1,774,414 | Bleriot | Aug. 26, 1930 |
| 1,797,326 | Christmas | Mar. 24, 1931 |
| 1,838,297 | Burnelli | Dec. 29, 1931 |
| 2,380,290 | Burnelli | July 10, 1945 |
| 2,387,527 | Nagamatsu | Oct. 23, 1946 |
| 2,463,346 | Akerman | Mar. 1, 1949 |

FOREIGN PATENTS

| Number | Country | Date |
| --- | --- | --- |
| 139,295 | Great Britain | Mar. 4, 1920 |
| 575,532 | Great Britain | Mar. 22, 1945 |
| 629,362 | France | July 25, 1927 |
| 636,354 | France | Jan. 11, 1928 |